UNITED STATES PATENT OFFICE.

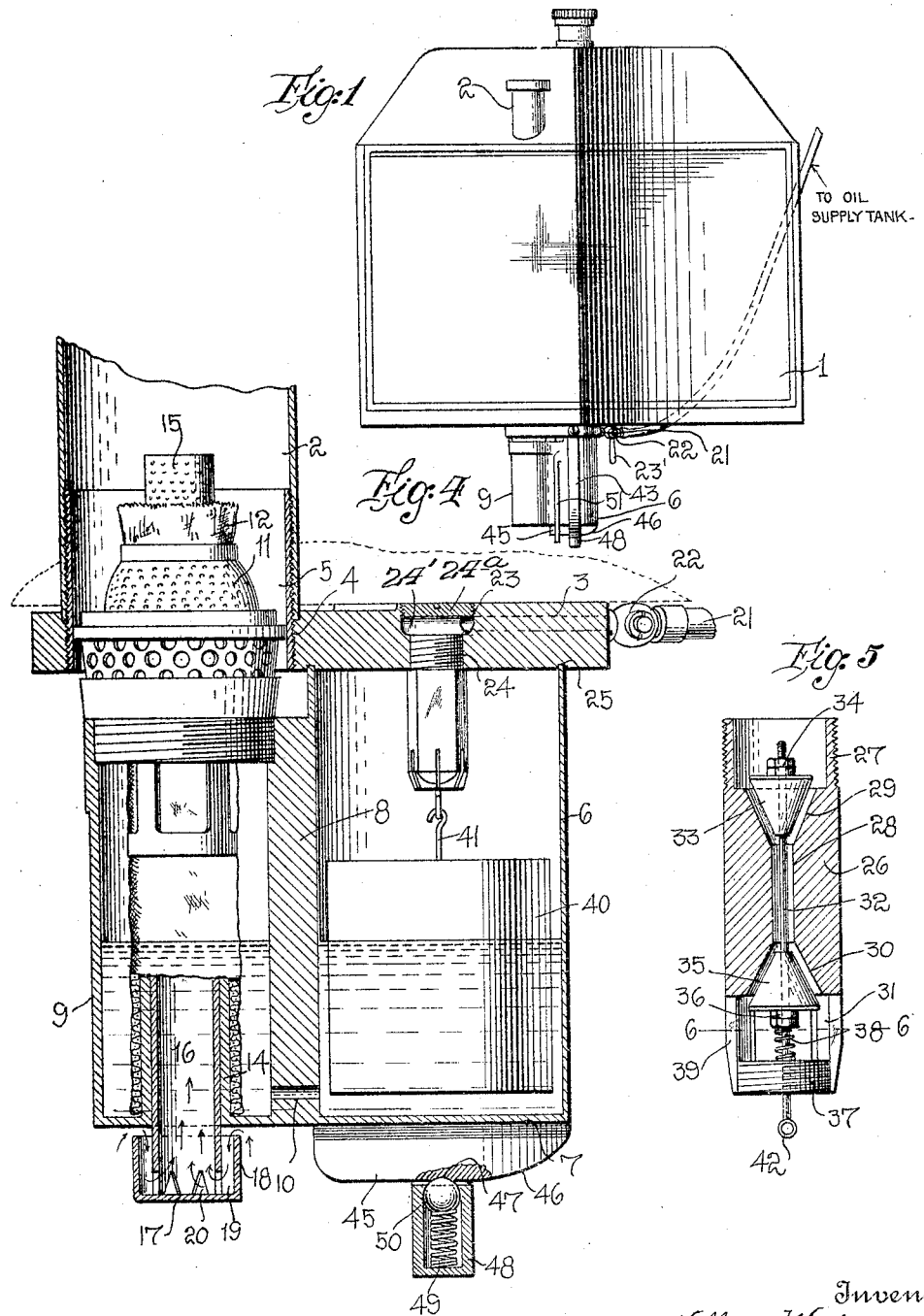

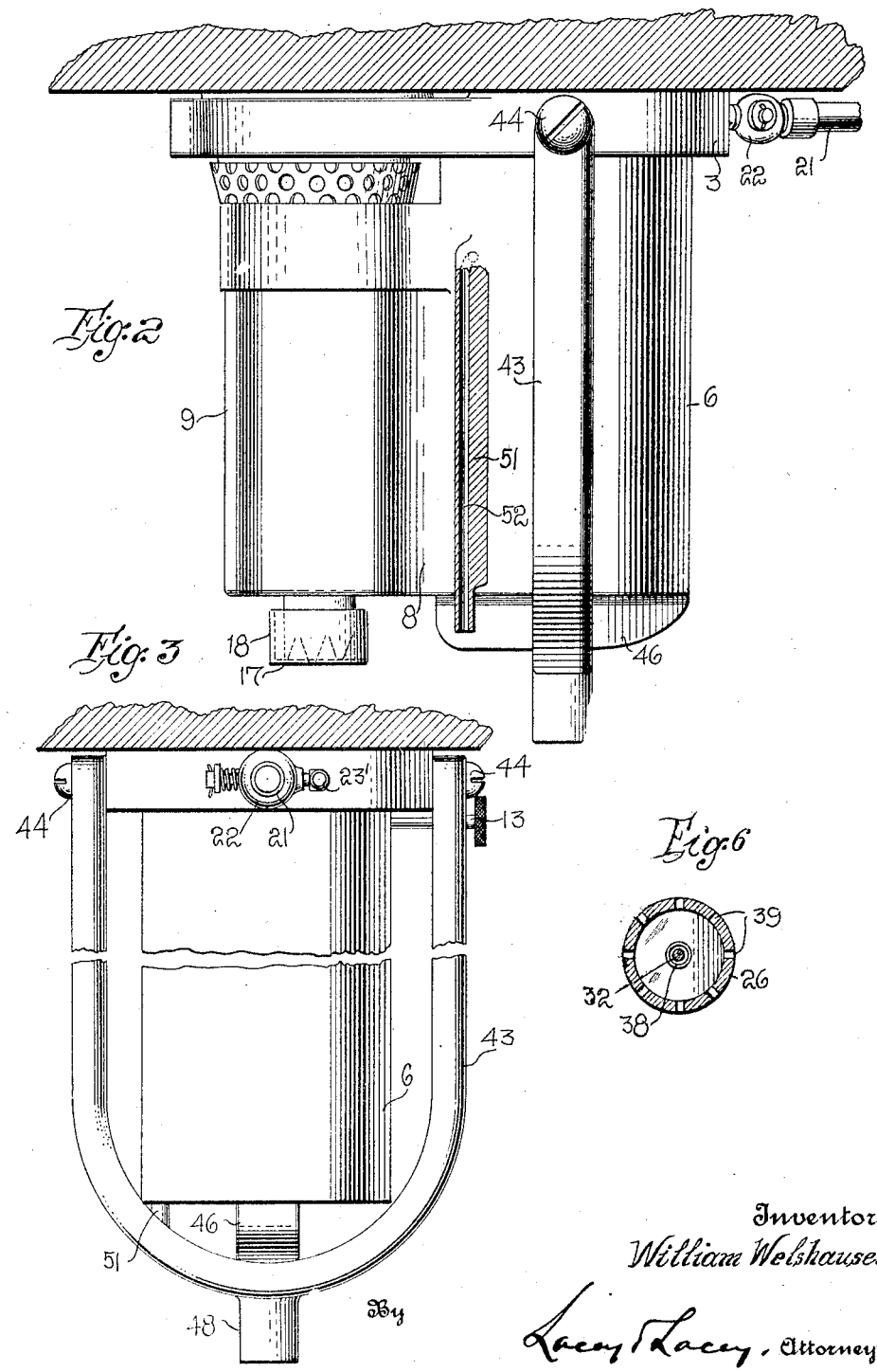

WILLIAM WELSHAUSEN, OF ALLENHURST, NEW JERSEY.

LIQUID-FUEL BURNER.

1,334,006.  Specification of Letters Patent.  Patented Mar. 16, 1920.

Application filed December 2, 1918. Serial No. 265,003.

*To all whom it may concern:*

Be it known that I, WILLIAM WELSHAUSEN, citizen of the United States, residing at Allenhurst, in the county of Monmouth and State of New Jersey, have invented certain new and useful Improvements in Liquid-Fuel Burners, of which the following is a specification.

This invention relates to liquid fuel burners and more particularly to a burner designed for employment in connection with an automobile radiator for the purpose of maintaining the water in the radiator at a temperature above freezing, and the burner is particularly designed for use in connection with the automobile radiator heating system shown and described in my copending application for patent filed April 11, 1917, Serial Number 161,247.

One object of the invention is the provision of a base adapted for permanent connection with the lower end of the flue of the heating system, and means for locking the burner to the base, which means may be readily manipulated, without the employment of tools, to release the burner so that the burner may be cleaned and its parts adjusted when required.

Another object of the invention is the provision, in a burner of this class, of a fuel font, a float chamber in communication therewith, and a novel arrangement of valve and float for controlling the supply of liquid fuel to the float chamber from whence it flows to the fuel font of the burner.

A further object of the invention is to so construct the valve above referred to that the same will automatically close to cut off the supply of liquid fuel to the burner when the fuel in the fuel font has reached a predetermined level and also when the burner is removed from its supporting base so that, in the latter instance, the burner may be readily removed whenever desired without the necessity of first positively cutting off the supply of fuel from the source of supply to the float chamber or the burner as a whole and without likelihood of fuel being wasted through continuation of the supply after removal of the burner from its said base.

A further object of the invention is to so construct the valve that it in itself may be readily disconnected from the supporting base for the burner to permit of adjustment of the valve parts or cleaning or repairs.

A further object of the invention is to so construct the valve that the float connected therewith will serve through its weight to automatically close the valve when the burner, including the float chamber, is disconnected from the supporting base, so as to automatically cut off the flow of liquid fuel from the source of supply, the valve being further so constructed as to automatically close upon disconnection of the float therefrom.

A still further object of the invention is to so construct the casing for the valve that the liquid fuel may have unrestricted flow therefrom and into the float chamber.

Another object of the invention is the provision of an overflow from the float chamber the purpose of which is to prevent flooding of the fuel font and burner with the possible result of fire, in the event the float or valve should for any reason become disarranged and rendered inactive to automatically control the supply of fuel.

In the accompanying drawings:

Figure 1 is a front elevation of the device applied to an automobile radiator;

Fig. 2 is a detail view in front elevation of the device, the overflow from the float chamber being shown in section;

Fig. 3 is a side elevation of the device;

Fig. 4 is a vertical longitudinal sectional view therethrough;

Fig. 5 is a detail vertical sectional view through the valve;

Fig. 6 is a horizontal sectional view taken substantially on the line 6—6 of Fig. 5.

In the drawings the numeral 1 indicates the radiator of an automobile and in connection with the radiator the burner of the present invention and a heating system, such for example as disclosed in my above identified application, are to be employed. The heating system may be identical with that shown in the said copending application or it may be any system including in its structure a flue at the lower end of which there is to be arranged a burner for supplying the heat required to render the system effective and in the drawings such a flue is indicated by the numeral 2. The flue 2 terminates at its lower end at the bottom of the radiator and opens through the said bottom, and the upper end of the flue may extend through the top of the radiator or through the rear side thereof, as may be found most desirable. The device embodying the present invention includes a supporting base member which is indicated in general by the numeral 3 and which is of oblong form and near one end is formed with an opening 4 the wall of which is preferably threaded. Fitted into the said opening 4 is the lower end of a pipe section 5, and the portion of this pipe section which extends above the upper surface of the base member 3 is threaded or otherwise fitted in a substantial and permanent manner into the lower end of the flue 2. In this manner the base 3 is firmly supported in position against the underside of the bottom wall of the radiator 1 and it permanently retains this position.

The device further includes a burner proper, a liquid fuel font, and a float chamber which is in communication with the font. In the drawings the float chamber is indicated in general by the numeral 6 and is preferably of substantially cylindrical form, open at its upper end and closed at its lower end, the bottom of said chamber being indicated by the numeral 7. The liquid fuel font is indicated by the numeral 9 and is also of substantially cylindrical form as in the instance of the float chamber, communication between the said chamber and font being provided by an opening 10 which is formed in the intervening wall 8 near the bottom 7 of the said float chamber. The burner proper includes a burner head indicated by the numeral 11, the usual wick 12, and an air supply tube 14 which extends upwardly centrally of the liquid fuel font 9 and through the burner head 11, being provided at its upper end with a foraminous section indicated by the numeral 15 which is surrounded by the upper end of the wick 12 and through which air to support combustion is supplied as in ordinary burner construction. The tube 14 is open at its lower end through the bottom of the font as clearly shown in Fig. 4 of the drawings, and fitted into the lower end of the tube is a vent tube 16 closed at its lower end by the bottom 17 of a cup provided with a surrounding wall 18 which is spaced from the wall of the vent tube so as to form an air inlet chamber 19, the tube 16 being fitted into the lower end of the tube 14 in such manner that the wall 18 will be spaced a suitable distance below the closed bottom of the liquid fuel font to permit the passage of air into the chamber 19 in the cup. After entering or being drawn into the chamber 19, the air which is to support combustion passes into the tube 16 through suitable openings 20 formed in the tube at its lower end and establishing communication between the interior of the tube and the said air chamber 19. In this manner air is supplied to the burner proper which burner, as illustrated in Fig. 4 of the drawings, is fitted into the upper end of the said liquid fuel font. Of course the supply of air may be varied by raising or lowering the tube 16 so as to position the upper edge of the cup wall 18 a greater or less distance from the closed bottom of the liquid fuel font.

The numeral 21 indicates a fuel supply pipe which leads from any suitable source of liquid fuel supply (not shown) and this pipe at its discharge or supply end connects with the casing of a cut off valve 22 the handle of which is indicated by the numeral 23' and may be manually manipulated so as to open or close the valve and thus control the supply of fuel through the valve. The outlet of the valve casing is connected to one end of the supporting base 3 and is in communication with a passage 23 formed in the said base and extending inwardly from the said end, and from said passage a threaded socket 24 opens downwardly through the under side of the base. The socket 24 is located concentrically to an annular groove 25 also formed in the under side of the base and in which groove is seated the upper edge of the wall of the float chamber 6 as clearly shown in Fig. 4.

As before stated, an automatic valve is provided for controlling the supply of liquid fuel to the float chamber 6 and this valve is clearly shown in Figs. 4, 5 and 6 of the drawings and includes a valve casing indicated in general by the numeral 26. At its upper end this casing is provided with a neck 27 which is exteriorly threaded and which is fitted into the threaded socket 24, this end of the casing constituting the intake end. The casing is formed axially with a fuel passage 28 which at its upper end is flared to form a valve seat 29 in communication with the interior of the neck 27. Likewise the lower end of the passage 28 is flared to provide a valve seat 30, and the casing is formed at its lower end with a depending neck 31 which is of greater diameter interiorly than the major diameter of the valve seat 30. Preferably the casing 26 is of polygonal form exteriorly so as to permit of the application of a wrench in fitting the casing into the socket 24 and in removing the casing for the purpose of repair or cleaning of the valve parts. The valve proper includes a stem 32 which is of a diameter less than that of the passage 28 and which extends through the said passage, and to the upper end of this stem there is fitted a conical valve head 33 designed for coöperation with the seat 29, the head being secured in place by nuts 34 threaded onto the upper end of the stem and bearing against the major end of the head. Likewise a conical valve head 35 is fitted to the stem 32 and secured by nuts 36, this head being designed for coöperation with the valve seat 30. The valve heads 33 and 35 are so relatively spaced upon the stem 32 that the distance between them will be greater than the distance between the valve seats 29 and 30 with the result that both valves may be simultaneously in open position as shown in Fig. 5 of the drawings, to provide for the passage of liquid fuel from the supply pipe 21 into the float chamber 6, or either valve may engage its seat so as to prevent the flow of fuel. The valve stem 32 extends below the head 35 and through an opening formed in a plug 37 which is adjustably threaded into the lower end of the neck 31, and a spring 38 is fitted to this downward extension of the valve stem and bears at its lower end against the said plug 37 and at its upper end against one of the nuts 36. Thus the tendency of the spring 38 is to shift the valve bodily upwardly so that the head 35 will engage the seat 30 and prevent the passage of liquid fuel into the float chamber, and the tension of this spring may be varied by adjusting the plug 37. In order that the liquid fuel after passing the valve 35, may have unrestricted passage from the neck 31 of the valve casing 26, the wall of the neck is formed with vertically extending slots 39, as clearly shown in Figs. 5 and 6.

The float heretofore referred to is indicated by the numeral 40 and may be of any desired construction and material although preferably in the nature of a hollow cylinder nearly the same diameter as the float chamber 6 and provided at its upper end with a hook 41 for detachable engagement with an eye 42 at the lower end of the valve stem 32.

In order that the float chamber, liquid fuel font, and burner may be bodily disconnected from the supporting base 3 when desired, means is provided which will now be described. The said means comprises a yoke 43 of substantially U shape and pivotally connected at the upper ends of its arms as at 44 to the front and rear sides of the base 3 so that it may have swinging movement in a vertical plane, and when the yoke is vertically disposed, it straddles the float chamber 6 as clearly shown in Figs. 2 and 3 of the drawings. A block 45 is formed or secured upon the bottom 7 of the float chamber and this block has its under side beveled or inclined at one end as indicated by the numeral 46 on an arc more or less eccentric to the arc described by the bight of the yoke 43 in moving upon its pivots 44. The underside of the block 45 is further formed with a depression or seat 47, and the yoke 43 at its bight is formed or provided with a tubular socket 48 in which is arranged a compression spring 49 bearing against a ball element 50 which is disposed within the upper end of the socket and projects for a portion of its circumference beyond the upper side of the bight of the yoke.

It will now be understood that the parts having been assembled by disposing the upper edge of the wall of the float chamber 6 in the groove 25 in the manner shown in Fig. 4, the yoke 43 may be swung downwardly and to the left in the said figure, so that first the ball element 50 will ride over the bevel or inclined surface 46 of the block 45 and finally this element will seat in the depression 47 as clearly shown in the said figure, and when the yoke has been brought to the position shown in Figs. 2, 3 and 4 of the drawings, the same will securely lock the upper end of the float chamber against the under side of the supporting base 3, and as the liquid fuel font 9 is integrally connected with this chamber and the burner proper is supported by the said font, these latter parts of the structure will be supported in their proper positions. When it is desired to disassemble the parts, however, it is only necessary to grasp the bight of the yoke and swing the same to the right in Fig. 4 until the bight of the yoke or more specifically the ball element 50 has cleared the block 45.

In order to prevent flooding of the liquid fuel font in the event of disarrangement of the float 40 or some part of the automatic valve shown in Fig. 5 which disarrangement would render these parts inactive and permit the continued flow of fuel into the float chamber, the said chamber is provided with an overflow in the nature of a vertically extending boss 51 formed upon one side of the float chamber at the exterior thereof and provided with a liquid fuel passage 52 which communicates at its upper end with the interior of the chamber near the upper end of the latter and at its lower end is arranged to discharge at a suitable point below the bottom of the said float chamber.

From the foregoing description of the invention it will be understood that having opened the valve 22, liquid fuel will flow from the pipe 21 into the float chamber 6 by way of the automatic valve until the level of the fuel in the said float chamber and fuel font has reached a predetermined point. Beyond such point, the float 40 will rise with the level of the liquid fuel within the float chamber until finally the float will no longer impose a weight upon the valve stem 32, and the spring 38 will shift the valve bodily so as to engage the head 35 within the seat 30 thus preventing further supply of liquid fuel to the float chamber. As the fuel is consumed, however, and its level falls in the fuel font and the float chamber, the float 40 will likewise descend until the valve assumes the intermediate position shown in Fig. 5 of the drawings in which position the liquid fuel may flow past both valve heads and into the float chamber. Thus the supply of liquid fuel to the burner is automatically controlled and there is at all times only a minimum amount of fuel actually within the burner font. Should it be desired to disconnect the parts, this may be accomplished in the manner heretofore set forth, and upon lowering the float chamber and fuel font from engagement with the base 3, the entire weight of the float 40 will be imposed upon the valve stem 32 with the result that the force of the spring 38 will be overcome and the head 33 will be brought to rest upon the seat 29 thus effectually cutting off the supply of fuel which would otherwise be wasted. Even should it be desired to disconnect the float from the valve stem 32, the supply of fuel through the valve will be prevented, and no waste will be occasioned, inasmuch as the spring 38 will immediately close the head 35 of the valve against the seat 30 when the stem of the valve is relieved of the weight of the float. Should any of the parts of the valve or should the float become disarranged in such a manner as to permit an uninterrupted flow of fuel into the float chamber, the fuel font will not become flooded nor will there be any overflow of fuel at the burning upper end of the wick 12 which would be liable to occasion fire, inasmuch as in such event the liquid fuel could not rise within the float chamber or font above the level of the upper end of the overflow passage 52 but the surplus fuel would merely overflow through this passage.

In practice I find it desirable to bore an opening 24' in the upper side of the base member 3 and communicating with the upper end of the socket 24, in other words, located immediately above the upper end of the valve casing 26, so that access may be readily had to the nuts 34 upon the upper end of the valve stem for the purpose of adjusting the valve 33 thus obviating the necessity of removing the entire valve casing for the purpose of effecting such adjustment. This opening I preferably close by a small threaded cap screw 24ª.

In the drawings the flue 2 is located substantially at the center of the front of the radiator and it will be understood that a single flue thus placed will distribute the heat substantially uniformly to both sides of the radiator, but that where the radiator is exceptionally large, two of the flues may be employed if desired.

Having thus described the invention, what is claimed as new is:

1. In a device of the class described, a base member having a fuel supply passage opening through its under side, a burner having an oil receiving chamber open at its upper end and disposed against the said under side of the base member to receive liquid fuel from the passage, and means for detachably holding the said chamber assembled with the base member, said means including a yoke pivotally suspended from the base member and arranged to straddle the said chamber, the bottom of the said chamber including a portion presenting an inclined face eccentric to the arc described by the bight of the yoke in swinging upon its pivot, the said bight of the yoke having a portion for coaction with the said inclined face.

2. In a device of the class described, a base member having a fuel supply passage opening through its under side, a burner having an oil receiving chamber open at its upper end and disposed against the said under side of the base member to receive liquid fuel from the passage, and means for detachably holding the said chamber assembled with the base member, said means including a yoke pivotally suspended from the base member, the bottom of the chamber having a portion provided with a seat, and a spring pressed element carried by the bight of the yoke and engageable in said seat.

3. In a device of the class described, a base member having a fuel supply passage opening through its under side, a burner having an oil receiving chamber open at its upper end and disposed against the said under side of the base member to receive liquid fuel from the passage, and means for detachably holding the said chamber assembled with the base member, said means including a yoke pivotally suspended from the base member and engageable at its bight against the lower end of the said chamber, the under side of the base member having a groove therein receiving the upper edge of the wall of the said chamber.

4. In a device of the class described, a base having a fuel supply passage opening through it, a burner having an oil receiving chamber open at its upper end and disposed against the under side of the base around said passage, a yoke pivotally suspended from the base and arranged to straddle the said chamber, a block on the bottom of the said chamber having a face inclined to the arc described by the bight of the yoke in swinging upon its pivot, the said face having a seat, a socket carried by the bight of the yoke, and a spring-pressed ball in said socket for coaction with the said inclined face and its seat.

5. In a device of the class described, a base member having a fuel inlet, a valve casing in communication with the inlet and provided with a fuel passage and at each end thereof with a valve seat, a valve stem extending through the passage, valve heads upon the stem for coaction with the said seats, a spring urging the valve in an upward direction to seat the lower head, the casing at its lower end being interiorly enlarged and threaded and provided in the wall of its enlarged portion with fuel discharge openings, a plug screwed into said threads and adjustably supporting said spring, a float connected with the lower end of the valve stem, a float chamber below the base member housing the said float, and a burner having a font in communication with the said chamber.

6. In a device of the class described, a base member having a fuel passage therein, a valve casing in communication with one end of the passage and itself provided with a fuel passage and at each end of the passage with a valve seat, a valve stem extending through the passage in the casing, valve heads upon the stem for coaction with the said seats, a spring surrounding the valve stem for urging the valve in an upward direction to seat the lower head, a float connected with the lower end of the valve stem and of sufficient weight when not floating to overcome said spring and seat the upper valve head, a float chamber below the base member housing the said float, and a burner having a font in communication with the said chamber.

7. In a device of the class described, a base member having a fuel passage therein, a valve casing in communication with one end of the passage and itself provided with a fuel passage and at each end of the passage with a valve seat, a valve stem extending through the passage in the casing, valve heads upon the stem for coaction with the said seats, means urging the valve in an upward direction to seat the lower head, a float connected with the lower end of the valve stem, a float chamber below the base member housing the said float, and means detachably holding the said chamber assembled with the said base.

8. In a device of the class described, a base member having a fuel passage therein, a valve casing in communication with one end of the passage and itself provided with a fuel passage and at each end of the passage with a valve seat, a valve stem extending through the passage in the casing, valve heads upon the stem for coaction with the said seats, means urging the valve in an upward direction to seat the lower head, a float connected with the lower end of the valve stem, a float chamber below the base member housing the said float, and a burner having a font in communication with the said chamber, the casing at its lower end being interiorly enlarged and closed at its lower extremity and provided in the wall of its enlarged portion with fuel discharge openings.

9. An automatic valve for a device of the class described including a casing having a fuel passage extending therethrough and provided at each end of the passage with a valve seat, a valve stem extending through the passage, spaced heads upon the stem for coaction with the respective seats, a spring bearing against the lower head and tending to move the valve bodily in an upward direction to seat the lower head, means for varying the tension of the spring, and a float suspended from the lower end of the stem.

10. An automatic valve for a device of the class described including a casing having a fuel passage extending therethrough and provided at each end of the passage with a valve seat, a valve stem extending through the passage, spaced heads upon the stem for coaction with the respective seats, a spring bearing against the lower head and tending to move the valve bodily in an upward direction to seat the lower head, means for varying the tension of the spring, and a float suspended from the lower end of the stem and detachably connected therewith.

11. In a device of the class described, a liquid fuel font having an upstanding tube fixed therein, a burner at the upper end of the tube, an air vent tube slidably adjustable within said fixed tube and projecting below the font and having openings in its wall at its lower extremity, and a cup whose bottom is fixed across said extremity and whose wall surrounds and is spaced from the vent tube whereby sliding of the latter adjusts the distance between the upper edge of said cup-wall and the bottom of the font.

12. In a device of the class described, a base having a passage extending edgewise through it and an upright threaded socket intersecting said passage and continued upward and opening through the top of the base, a valve casing having a threaded neck engaging said socket and a body pendant from said base, a stem movable in said casing and controlled from below, a head on the stem, fastening means therefor above the head, and a cap screwed into the upper end of the opening in said base and removable in order to gain access to said fastening means.

In testimony whereof I affix my signature

WILLIAM WELSHAUSEN. [L. S.]